(12) United States Patent
Jaaskelainen et al.

(10) Patent No.: US 10,120,094 B2
(45) Date of Patent: Nov. 6, 2018

(54) SEISMIC MONITORING BELOW SOURCE TOOL

(71) Applicant: Halliburton Energy Services, Inc., Houston, TX (US)

(72) Inventors: Mikko Jaaskelainen, Katy, TX (US); Jason Edward Therrien, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 153 days.

(21) Appl. No.: 15/310,565

(22) PCT Filed: Aug. 25, 2014

(86) PCT No.: PCT/US2014/052494
§ 371 (c)(1),
(2) Date: Nov. 11, 2016

(87) PCT Pub. No.: WO2016/032422
PCT Pub. Date: Mar. 3, 2016

(65) Prior Publication Data
US 2017/0075017 A1    Mar. 16, 2017

(51) Int. Cl.
*G01V 1/00*    (2006.01)
*G01V 1/52*    (2006.01)
(Continued)

(52) U.S. Cl.
CPC ............ *G01V 1/52* (2013.01); *E21B 23/14* (2013.01); *E21B 49/00* (2013.01); *G01V 1/40* (2013.01);
(Continued)

(58) Field of Classification Search
CPC ......... E21B 23/14; E21B 49/00; G01H 9/004; G01V 1/52; G01V 2001/526; G02B 6/4413; G02B 6/4416
See application file for complete search history.

(56) References Cited

U.S. PATENT DOCUMENTS 6,561,488 B1 *  5/2003  Walker ................. G02B 6/4464
                                                     15/104.061
6,923,291 B2    8/2005  Paulsson et al.
(Continued)

FOREIGN PATENT DOCUMENTS

WO    2013103908    7/2013
WO    2016032422    3/2016

OTHER PUBLICATIONS

International Patent Application PCT/US2014/052494, International Search Report and Written Opinion dated May 22, 2015, 11 pages.

*Primary Examiner* — Krystine E Breier
(74) *Attorney, Agent, or Firm* — Kilpatrick Townsend & Stockton LLP

(57) ABSTRACT

A sensory assembly and system can be used in a wellbore to detect and characterize the earth strata and formations around the wellbore, where a signal emitting sensory tool is part of a tool string deployed in the wellbore, and where weighted fiber optic cable is deployed in an extended position below the signal emitting sensory tool. The fiber optic cable is also part of wire-line, slickline, or coiled tubing injector head connected to the signal emitting sensory tool, thereby providing fiber optic cable both above and below the signal emitting sensory tool in position to collect backscatter signals from earth strata and formations around the wellbore. The collection of backscatter signals, particu-
(Continued)

larly from below the signal emitting sensory tool, allows for more precise characterization of formations and fractures within the earth strata.

20 Claims, 12 Drawing Sheets

(51) Int. Cl.
*G01V 1/40* (2006.01)
*E21B 23/14* (2006.01)
*E21B 49/00* (2006.01)
*G01V 1/50* (2006.01)
*G02B 6/44* (2006.01)

(52) U.S. Cl.
CPC ............. *G01V 1/50* (2013.01); *G02B 6/4413* (2013.01); *G02B 6/4416* (2013.01)

(56) References Cited

U.S. PATENT DOCUMENTS

| | | | |
|---|---|---|---|
| 7,287,596 B2* | 10/2007 | Frazier | E21B 34/06 |
| | | | 166/332.4 |
| 7,567,485 B2 | 7/2009 | Nutt et al. | |
| 9,759,824 B2* | 9/2017 | Lumens | G01V 1/288 |
| 9,784,884 B2* | 10/2017 | Quintero | G01V 1/226 |
| 2002/0039328 A1 | 4/2002 | Dubinsky et al. | |
| 2006/0071770 A1 | 4/2006 | Giotto et al. | |
| 2010/0051286 A1 | 3/2010 | McStay et al. | |
| 2012/0111104 A1* | 5/2012 | Taverner | G01H 9/004 |
| | | | 73/152.16 |
| 2015/0285065 A1* | 10/2015 | Howell | E21B 47/0005 |
| | | | 367/82 |

* cited by examiner

SEISMIC MONITORING BELOW SOURCE TOOL

CROSS-REFERENCE TO RELATED APPLICATIONS

This is a U.S. national phase under 35 U.S.C. 371 of International Patent Application No. PCT/US2014/052494, titled "SEISMIC MONITORING BELOW SOURCE TOOL" and filed Aug. 25, 2014, the entirety of which is incorporated herein by reference.

TECHNICAL FIELD

This disclosure relates to apparatus and systems using fiber optics as sensory tools in hydrocarbon wells and other wells.

BACKGROUND

In conventional wellbore or reservoir sensory and monitoring devices, the sensing element is a physical device usually placed at the end of a copper line. Fiber optic cables can be used to replace traditional sensory and monitoring devices, where the fiber itself is the sensory element. Fiber optic cables used in conjunction with acoustic sensors, as known in the industry, generally do not capture signal from below a source signal generation tool.

BRIEF DESCRIPTION OF THE DRAWINGS

Illustrative aspects of the present disclosure are described in detail below with reference to the following drawing figures.

FIG. 1-1 is a schematic diagram of a tool string and a weighted fiber optic cable, according to some aspects of the present disclosure.

FIG. 2-1 is a schematic diagram of a tool string and a weighted fiber optic cable positioned above the well head of a wellbore, according to some aspects of the present disclosure.

FIG. 3-1 is a schematic diagram of a tool string and a weighted fiber optic cable positioned above the well head of a wellbore, where the weighted fiber optic cable is in an extended position, according to some aspects of the present disclosure.

FIG. 4-1 is a schematic diagram of a tool string and a weighted fiber optic cable, where the weighted fiber optic cable is in an extended position and where a tool string is deployed into a wellbore, according to some aspects of the present disclosure.

DETAILED DESCRIPTION

Figure 1:
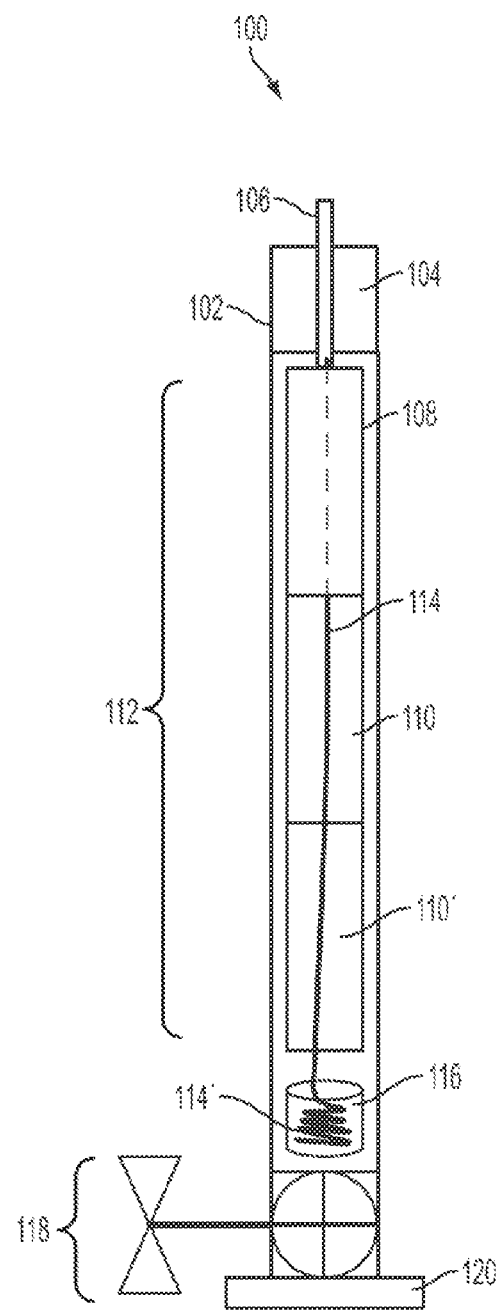
FIG. 1 is a schematic diagram of a tube assembly having a weighted fiber optic cable, according to some aspects of the present disclosure.
Figure 1:
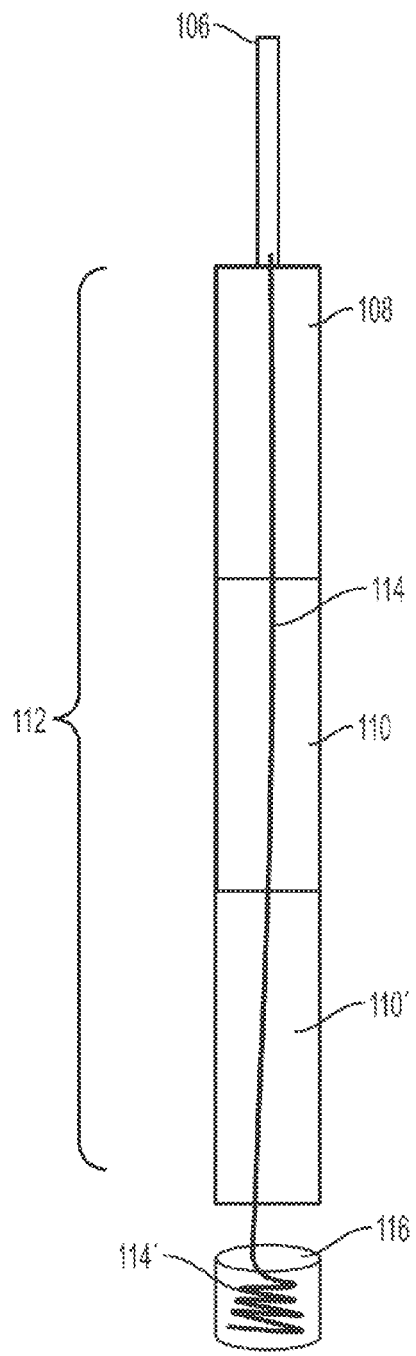

Certain aspects of the present disclosure relate to forming and deploying sections of fiber optic cable in a wellbore environment, where regions of the fiber optic cable are positioned below a source tool to collect backscatter signals that would otherwise be undetected by a deployed tool string. With fiber optic sensing, an entire length of fiber optic cable can be used as a sensing tool or element, where the sensing is thereby distributed along the length of the fiber. The modules that emit a signal, however, may direct energy, or cause backscatter signals to reflect off of earth strata, away from region of a wellbore where fiber optic cable is present. In aspects as disclosed herein, at least a portion of fiber optic line is deployed below a source emitting tool or module, such that a more complete profile of earth strata is captured by the overall sensing tool.

Wire-line, slickline, and coiled tubing sensory tools are often deployed as part of a tool string at the end of a cable, whereas the source tools or source tool modules generating a signal may be omnidirectional, directional by intentional design, or directional by design or environmental constraints. Accordingly, a source tool that emits signal to measure reflections (i.e. backscatter) in earth strata, particularly to measure seismic characteristics of earth strata formations, can direct a significant amount of energy away from any part of the tool string used for sensing. In aspects of the present disclosure, optical fiber can be used as part of the line, wire, or cable connecting a source tool to the surface of a well, where the optical fiber further functions as an antenna or sensory tool receiving signals that are reflected back toward the tool string. In some applications, a source tool can direct a large majority of its signal in a forty-five degree (45°) cone profile, downhole and away from optical fiber connected to the uphole end of the source tool. Such a tool string arrangement or configuration may have minimal utility, where little useful information may be gained as the energy reflected from earth strata formations and any region of interest may never reach the sensory optical fiber of the tool string.

In characterizing an earth formation for hydrofracture, it is important to accurately identify elements of a formation, such as microfractures. In some formations, a salt dome, fault rock, or other such hydrocarbon impermeable cap may be present and positioned over a reservoir. Drilling through or otherwise damaging the hydrocarbon impermeable cap could lead to loss of hydrocarbon from the formation, reducing the efficacy of drilling for a given reservoir. With sensory tools that lack the ability to receive signals indicative of the underside or bottom of a formation, there can be inaccuracy in drilling, resulting in the loss of hydrocarbons from a reservoir or formation of interest.

Adding wire-line or slickline below a tool string region including a source tool can be challenging. In particular, sinker bars and the source tool itself as arranged within a tube assembly for deployment down a wellbore may adversely affect or damage wire-line or slickline positioned below the source tool and sinker bars, as the source tool and sinker bars would rest on top of such wire-line or slickline during manufacture, transport, and installation of the tool assembly. In many aspects, a tool assembly can include an assembly casing which encloses and houses the source tool and other components of the tool string and other apparatus. The assembly casing can mechanically couple with a wellhead assembly and, in part, provide a sealed, pressurized connection between the tool assembly and the wellbore in which the source tool and other components are deployed. Further, a tool assembly is limited in its overall length, thus additional wire-line or slickline positioned below a tool string would be limited in the potential length of wire-line or slickline that can fit within a tool assembly, below a source tool.

Embodiments and aspects of the present disclosure allow for the arrangement and deployment of optical fiber below a source tool, particularly where the source tool is a seismic source tool. A tube assembly can include and hold a tool string, a sheathed cable region, an optical fiber region, and a weight. The tool string, as discussed herein, refers to components or modules including sensory tools and sinker bars. An optical fiber stemming from a sheathed cable is routed past or bypasses the source tool, and is connected to a weight held below the source tool and any sinker bars. In some aspects, the weight held below the source tool and sinker bars is enclosed within a tube assembly. In other aspects, an amount of optical fiber can be coiled within an interior cavity of the weight, and configured to extend out of or unspool from the weight. In alternative aspects, the optical fiber can be wrapped around the weight itself.

When a tool string according to embodiments and aspects of the present disclosure is deployed within a wellbore, the weighted optical fiber can extend to a distance deeper downhole than the tool string. The weight can draw the optical fiber downhole, with the optical fiber uncoiling from the weight to a maximum length. In such aspects, when deployed in a wellbore, a portion of fiber optic cable is positioned below a source tool in the tool string. Concurrently, a portion of fiber optic cable, as part of the wire-line, is positioned above the source tool in the tool string. Accordingly, fiber optic cable is located both above and below the source tool to receive reflected or backscattered signals based on signals emitted from the source tool.

The illustrative examples discussed herein are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative aspects. The following sections use directional descriptions such as "uphole," "upward," "top," "downhole," "downward," "bottom," "inward," "outward," etc. in relation to the illustrative aspects as they are depicted in the figures, the uphole direction being toward the surface of the well or top of the tube assembly, the downhole direction being toward the toe of the well or bottom of the tube assembly, the inward direction being toward the longitudinal axis (which can also be referred to as the "primary axis" or "centerline") of the tool string, casing, mandrel, or tube assembly, and the outward direction being away from the longitudinal axis of the tool string, casing, mandrel, or tube assembly. Further, portions of structural elements described herein can be referred to by the general orientation of their ends when deployed, e.g. by an uphole or top end, or by a downhole or bottom end. Similarly, portions of structural elements described herein can be referred to by their interior (inward facing) and exterior (outward facing) surfaces. Like the illustrative aspects, the numerals and directional descriptions included in the following sections should not be used to limit the present disclosure.

Further, as used herein, the terms "wire-line" and "slickline" both refer to one or more fiber optic or electrically conductive cables bound within a cabling sheath or cladding. A "wire-line" cable has a sheath which has an armored exterior, while a "slickline" cable has a sheath with a smooth exterior. Accordingly, a wire-line cable with an armored exterior can provide for relatively greater structural support and protection of fiber optic or electrically conductive components than a slickline cable. In contrast, a slickline cable with a smooth or slick exterior can provide for relatively greater flexibility and less friction with the surrounding environment than a wire-line cable. As used herein, the term "sheathed cable" can refer to both wire-line cable and slickline cable. The decision to use either wire-line or slickline cable can depend on the application and particular wellbore environment in which the sheathed cable is to be deployed. In some aspects, individual fiber optic cables can be split or broken out of sheathed cable, and can be referred to as exposed fiber optic. Further, as used herein, "parent casing" refers to constructed walls of a wellbore, typically made of cement or metal tubing secured in position by cement, where the cement is poured or otherwise deposited to interface and hold to the earth strata of a well.

In alternative aspects, a tool string and weight module can be deployed into a wellbore independent of a tube assembly, particularly independent of an assembly casing. In other words, the tool string and weight module can be utilized in an uncapped well system, where a pressure seal and related pressure control is not required.

FIG. 1 is a schematic diagram of a tube assembly 100 having a weighted fiber optic cable. The tube assembly 100 can have an assembly casing 102 generally defining the length, diameter, and wall thickness of the tube assembly 100. In aspects, the assembly casing 102 can be constructed from any standard casing, tubing, or mandrel structures or materials known or used in the hydrocarbon industry. The interior of the assembly casing 102 is hollow, and can accommodate components of a tool string 112. In some aspects, a line head 104 can be located at or in the top of the assembly casing 102, where the line head 104 can include a wire-line head, a slick-line head, a coiled tubing injector head, a stuffing box, a grease head, and combinations of variations thereof. The line head 104 can mount and support a sheathed cable 106 that extends to the interior of the assembly casing 102. In alternative aspects, the sheathed cable 106 can be a wire-line or a slickline cable. In various aspects, the sheathed cable 106 can be a cable used to run tools, measurement equipment into a wellbore, where the sheathed cable 106 can include both electrical cable and fiber optic cable. In some aspects, the electrical cable and fiber optic cable of the sheathed cable 106 can be held within a single cladding or armor as part of the interior of a sheathed cable 106. In other aspects, electrical cable and fiber optic cable of the sheathed cable 106 can be braided, and in further aspects braided within a single cladding or armor. In further aspects, there can be a one or more electrical cables held within a sheathed cable 106, and in other aspects, there can be one or more fiber optic cables held within a sheathed cable 106. In other aspects, a coiled tubing housing optical fibers (not shown) can be held in the tool assembly below the line head 104, from which optical fibers can be deployed once positioned within a wellbore.

In some aspects, a sensory tool module 108 is mechanically and electrically coupled to the sheathed cable 106, where at least one electrical cable within the sheathed cable 106 can deliver power to the sensory tool module 108. In many aspects, the sensory tool module 108 includes a seismic source, which can include, but is not limited to, sources such as an air gun source, a plasma sound source a mechanical thumper apparatus, a non-explosive electromagnetic pulse source, a seismic vibrator, a boomer source, a simple noise source, or variations and combinations thereof. In further aspects, the sensory tool module 108 can contain one or more measurement devices to determine the properties of earth strata including, but not limited to: acoustic, sonic, and ultrasonic tools; resistivity tools; nuclear or gamma ray tools; magnetic resonance tools; seismic tools; pressure control tools; cased hole electric line tools, slicklines; and variations and combinations of the same.

In some aspects, at least one sinker bar 110 can be mechanically coupled to the sensory tool module 108, which in combination with each other can be referred to as a tool string 112. The sinker bar 110 (alternatively referred to as a stem), can be a bar-shaped weight used as part of a tool string 112 to overcome wellhead pressure and friction at the surface seal of a wellbore where the wire-line 108 and tool string 112 enters the wellbore. In some aspects, a sinker bar 110 can be constructed of solid steel. In other aspects, a sinker bar 110 can be constructed to have a relatively high-density by having internal cavities filled with metals including, but not limited to, lead, tungsten, mercury, and alloys or other combinations thereof. In other aspects one or more supplementary sinker bars 110' can be mechanically coupled as part of the tool string 112 to contribute to the weight of the tool string.

In many aspects, the sensory tool module 108 can include a distributed acoustic sensor. Distributed acoustic sensing (DAS) is an application of Rayleigh scattering which uses fiber optic cables to provide for distributed strain sensing. In DAS, an optical fiber cable is used as the sensing element, with measurements made and in part processed by an attached optoelectronic device. A DAS system allows for acoustic frequency strain signals to be detected across large distances, including subterranean detection, and in harsh or deleterious environments. In other aspects, coherent Rayleigh, Raman, Brillouin, Fiber Bragg Grating, Fabry-Perot interferometric sensing systems based on intrinsic cavities, Time Domain Multiplexing (TDM), Frequency Domain Multiplexing (FDM), Wavelength Domain Multiplexing (WDM), or other scattering and sensing techniques can be used in combination with apparatus included in the sensory tool module 108.

The sheathed cable 106 includes within its cladding a fiber optic cable 114. In some aspects, where the sheathed cable 106 is mechanically coupled to the sensory tool module 108, the fiber optic cable 114 can continue extending downward, bypassing the sensory tool module 108. The fiber optic cable 114 can break out from the sheathed cable 106 to extend, exposed without the sheathed cable 106 cladding, through the wellbore. Where the fiber optic cable 114 breaks out from the sheathed cable 106, a fiber optic pressure seal can prevent fluid or gas from entering the sheathed cable 106. The fiber optic cable 114 can bypass the sensory tool module 108 by being routed outside the sensory tool module 108 or by being fed through the sensory tool module 108 (as illustrated in FIG. 1). The fiber optic cable 114 can be further routed past a sinker bar 110 and past any one or more supplementary sinker bars 110'. Within the tube assembly 100, below the tool string 112, the fiber optic cable 114 can connect to a weight module 116. The weight module 116 can have a cavity in which an amount of fiber optic cable 114 can be coiled, where that portion of optical fiber can be referred to as coiled fiber optic cable 114'. In other words, the weight module 116 has a cavity constructed to accommodate a length of coiled fiber optic cable 114'. The portion of coiled fiber optic cable 114' held within the weight module 116 can thereby increase the overall amount of fiber optic cable 114 held within the tube assembly 100. As used herein, the fiber optic cable 114 and weight module 116 can be referred to in combination as a weighted fiber optic cable, which in some aspects can further include reference to coiled fiber optic cable 114' held within the weight module 116. In alternative aspects, the coiled fiber optic cable 114' can be wrapped around the weight module 116 itself.

In other aspects, fiber optic cable can be broken out and deployed from a coiled tubing housing located below the line head 104. Fiber optic cable 114 broken out from either a slickline or a coiled tubing housing can then bypass the sensory tool module 108 and any sinker bar 110 or supplementary sinker bars 110', ultimately connecting with a weight module 116.

In some aspects, in order to separate the fiber optic cable 114 from the tool string 112, a cage or a recess can be constructed in the downhole end of a lowest sinker bar 110 or supplementary sinker bar 110' in the tool string 112. In a cage or a recess within a sinker bar 110 or supplementary sinker bar 110', fiber optic cable 114 can be spooled and protected from physical damage when loading the assembly casing 102 with other components of the tool string, or when loading a lubricant into the line head 104 or with the tool string 112.

In some aspects, the sheathed cable 106 can have a diameter of about three-eighths of an inch (⅜") to about one-quarter of an inch (¼"). In other aspects, the sheathed cable 106 can have a diameter of up to about one-half of an inch (½") or up to about three-quarters of an inch (¾"). In particular aspects, the sheathed cable 106 can have a diameter of 0.092", 0.108', 0.125", 0.140", 0.150", 0.160", or 0.188". In many aspects, the fiber optic cable 114 has diameter narrower than the sheathed cable 106. Similarly, electrical conductive cable can be fit within the sheathed cable 106 having a diameter of about one-eighth of an inch (⅛") to about one-quarter of an inch (¼").

The tube assembly 100 can further have at its bottom an assembly valve 118 and a valve cap 120. The valve cap 120 can be configured to mechanically couple with the well head of a well system, for example, by bolting a flange of the valve cap 120 to a flange forming part of the well head. The interface between the valve cap 120 and the well head cap of a well head can form a pressure seal, maintaining a pressure within a wellbore and preventing the uncontrolled expulsion of gas or fluid from the wellbore.

FIG. 1-1 is a schematic diagram of a tool string 112 and a weighted fiber optic cable, independent of an assembly casing. As in other aspects, sheathed cable 106 includes within its cladding a fiber optic cable 114, where the sheathed cable 106 is mechanically coupled to the sensory tool module 108, and the fiber optic cable 114 can continue extending downward, bypassing the sensory tool module 108. The fiber optic cable 114 can break out from the sheathed cable 106 to extend, exposed without the sheathed cable 106 cladding, through the wellbore. Where the fiber optic cable 114 breaks out from the sheathed cable 106, a fiber optic pressure seal can prevent fluid or gas from entering the sheathed cable 106. The fiber optic cable 114 can bypass the sensory tool module 108 by being routed outside the sensory tool module 108 (as illustrated in FIG. 1-1 and thereafter) or by being fed through the sensory tool module 108. The fiber optic cable 114 can be further routed past a sinker bar 110 and past any one or more supplementary sinker bars 110'. Within the tube assembly 100, below the tool string 112, the fiber optic cable 114 can connect to a weight module 116. The weight module 116 can have a cavity in which an amount of fiber optic cable 114 can be coiled, where that portion of optical fiber can be referred to as coiled fiber optic cable 114'. In other words, the weight module 116 has a cavity constructed to accommodate a length of coiled fiber optic cable 114'. The portion of coiled fiber optic cable 114' held within the weight module 116 can thereby increase the overall amount of fiber optic cable 114 held within the tube assembly 100. As used herein, the fiber optic cable 114 and weight module 116 can be referred to in combination as a weighted fiber optic cable, which in some aspects can further include reference to coiled fiber optic cable 114' held within the weight module 116. In alternative aspects, the coiled fiber optic cable 114' can be wrapped around the weight module 116 itself.

The tool string 112 and weighted fiber optic cable, when configured or arranged independent of an assembly casing, can include a mechanical coupling or breaking mechanism to hold the weight module 116 at a position proximate to the tool string 112 until the tool string 112 and weighted fiber optic cable are in a position to be deployed in a wellbore.

Figure 2:
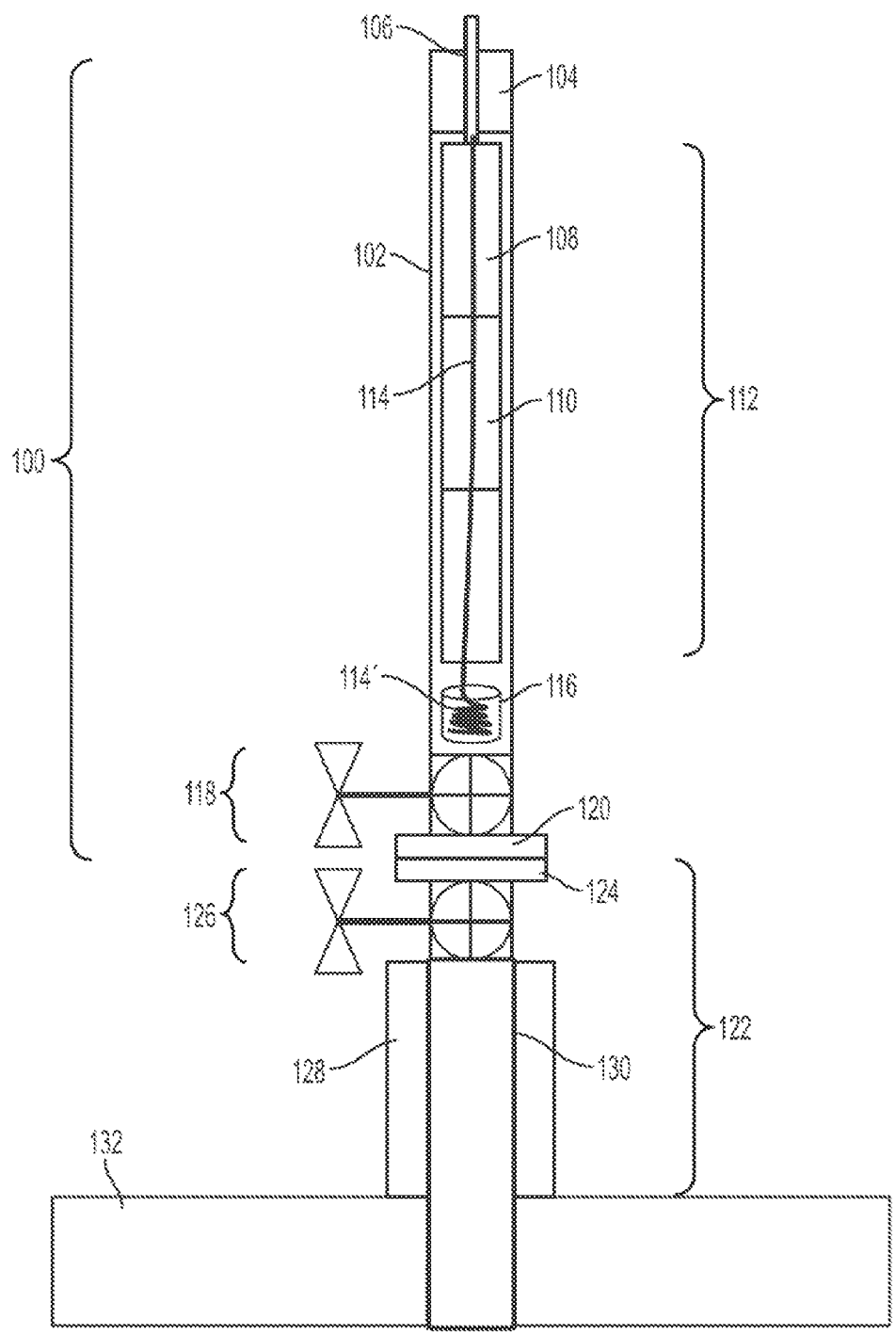
FIG. 2 is a schematic diagram of a tube assembly having a weighted fiber optic cable mounted to the well head of a wellbore, according to some aspects of the present disclosure.
Figures 1, 2:
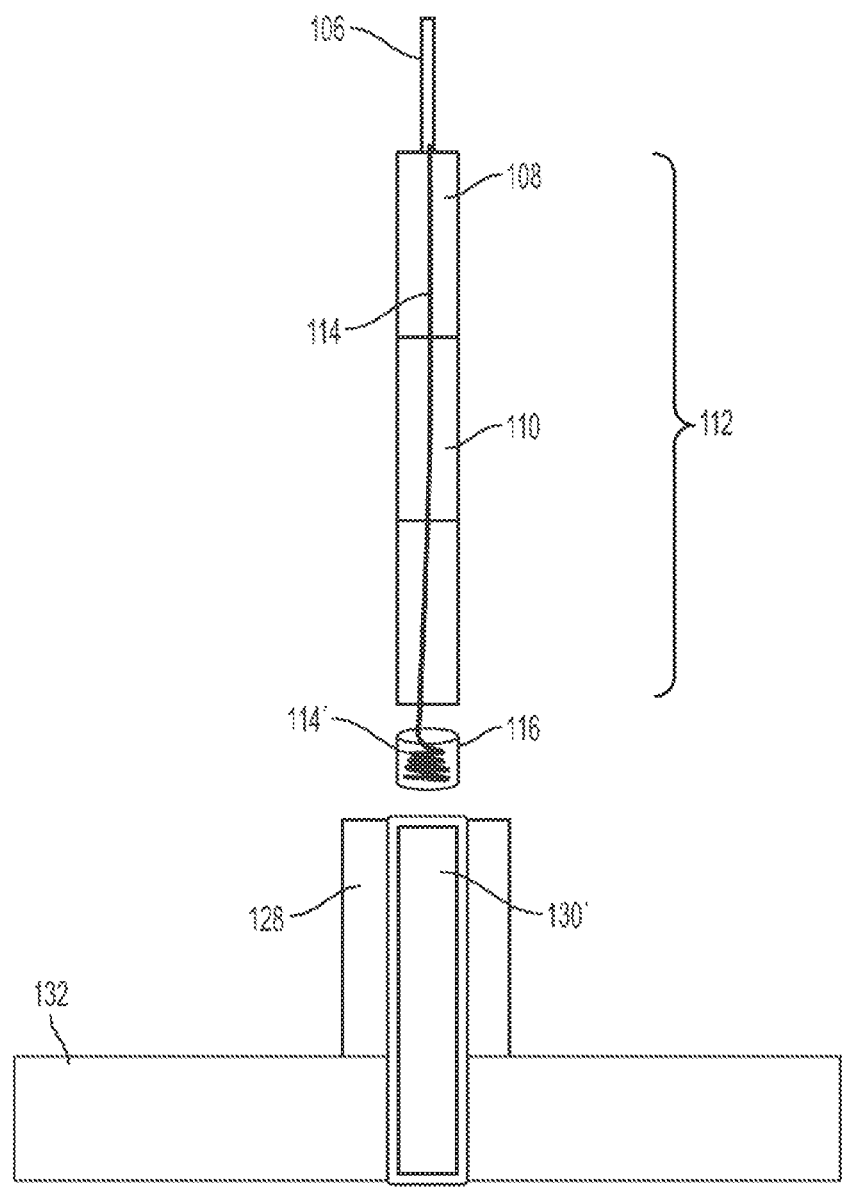

FIG. 2 is a schematic diagram of a tube assembly having a weighted fiber optic cable mounted to the well head of a wellbore. The valve cap 120 of the tube assembly 100 can couple to a well head assembly 122. In particular, the well head assembly 122 can include a well head cap 124 which can directly couple to a valve cap 120. The well head assembly 122 can further include a well head valve 126 mounted above a well head body 128. The well head body 128 can further define the entry to a wellbore tubing 130 which extends downward into earth strata 132. In some aspects, the wellbore tubing 130 can be a parent casing deposited along the sides of the wellbore, which can be a cement casing poured and set along the earth strata 132 walls of the wellbore. In other aspects, the parent casing can be a metal tubing deployed in the wellbore that is cemented into place, i.e. the cement is between the outside of the casing and the reservoir, formation, or rock strata. Where both the assembly valve 118 and the well head valve 126 are closed, the interior volume of tube assembly 100 and the wellbore tubing 130 in the well head assembly 122 are not in fluid communication with each other, and the weight module 116 remains held within the tube assembly 100.

As known in the field, a sheathed cable 106 can be used to suspend a tool string in a tube assembly 100 and within a wellbore. In some aspects, a sheathed cable 106 source can be run though pulleys supported by springs (not shown) and into wellbore tubing 130. The sheathed cable 106 can be placed under tension at the surface of the well, thereby providing support to suspend a tube assembly 100, tool string 112, and any other apparatus within a wellbore. When either or both of the assembly valve 118 and well head valve 126 are closed, the weight module 116 and coiled fiber optic cable 114' can rest within the tube assembly, underneath the weight of the tool string 112.

FIG. 2-1 is a schematic diagram of a tool string 112 and a weighted fiber optic cable positioned above the well head 112 of a wellbore 130'. In aspects as illustrated, the wellbore 130' does not include apparatus to particularly control the pressure of the wellbore 130'. Accordingly, the wellbore 130' is defined by parent casing secured to the walls of the earth strata 132. As in other aspects, the sheathed cable 106 source can be run though pulleys supported by springs (not shown) and into the wellbore 130'. The sheathed cable 106 can be placed under tension at the surface of the well at the well head 128, thereby providing support to suspend tool string 112, weight module 116, and any other apparatus within a wellbore 130'. In further aspects, pressure control equipment can be added to the well system subsequent to sensory logging, thereby putting the well under pressure for later application and use.

Figure 3:
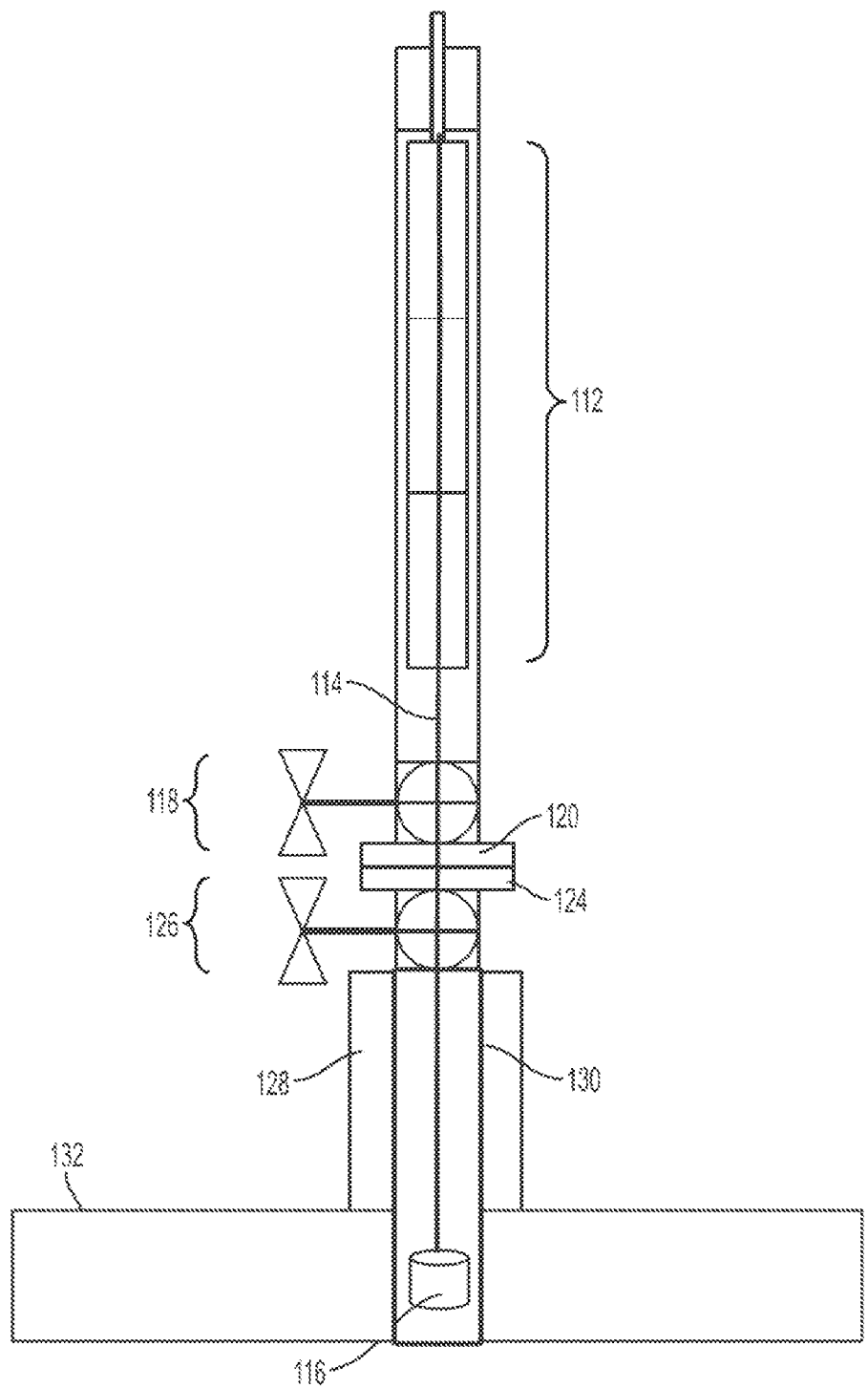
FIG. 3 is a schematic diagram of a tube assembly having a weighted fiber optic cable mounted to the well head of a wellbore, where the weighted fiber optic cable is in an extended position, according to some aspects of the present disclosure.
Figures 1, 3:
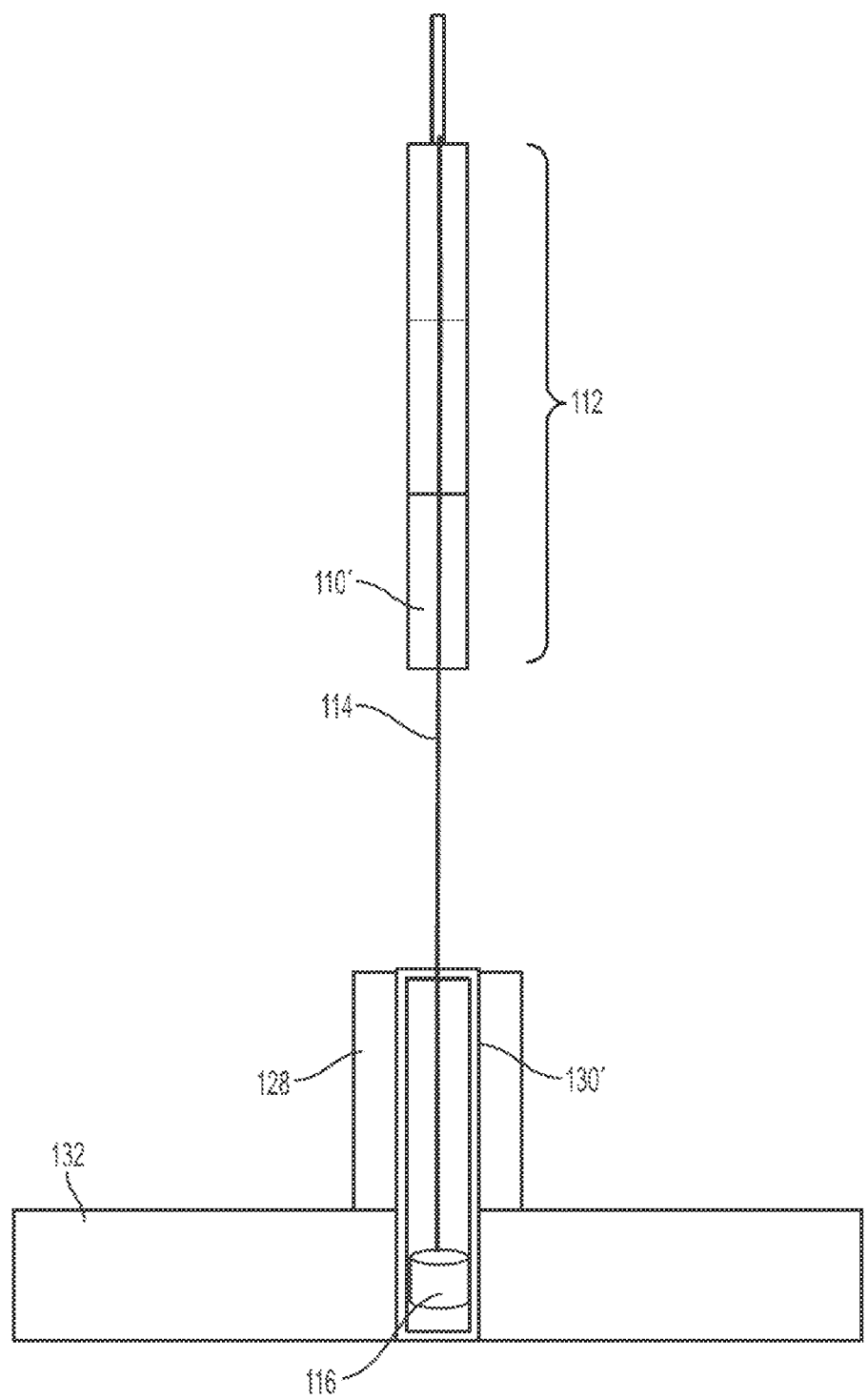

FIG. 3 is a schematic diagram of a tube assembly 100 having a weighted fiber optic cable mounted to the well head 122 of a wellbore, where the weighted fiber optic cable is in an extended position. As shown in FIG. 3, both the assembly valve 118 and the well head valve 126 are open, placing the interior volume of tube assembly 100 and the wellbore tubing 130 in fluid communication with each other. Further, with both the assembly valve 118 and the well head valve 126 open, the weight module 116 can descend into the well head body 128 and allowing whatever coiled fiber optic cable 114' is held within the weight module 116 to unspool and extend to a full length of fiber optic cable 114. In some aspects, the wellbore can be defined by the wellbore tubing 130, which can further be a casing built into the sides of the earth strata 132 in which a well is drilled. In other aspects, the wellbore can be a region of drilled earth strata 132 where no casing or tubing has been built, and in further aspects, the wellbore can be a combination of regions of wellbore tubing 130 and region of drilled earth strata 132 where no casing or tubing has been built.

In some aspects, any or all of the tube assembly 100, the tool string 112, the weight module 116, and the well head assembly 122 can include a speed regulating or braking mechanism coupled to the weight module 116 so that when the both the assembly valve 118 and the well head valve 126 are open, the weight module 116 descends into the wellbore, away from the sensory tool module 108 and tool string 112, in a controlled manner and at a speed that does not damage or break the fiber optic cable 114. In other aspects, when the fiber optic cable 114 is fully unspooled and extended within the wellbore, the fiber optic cable 114 can extend to a distance of about one hundred to several thousand feet below the sensory tool module 108. In some aspects, a tool string 112 having a weighted fiber optic cable can be used in a wellbore that has a depth of up to thirty thousand feet (30,000'). Accordingly, when the tool string 112 and sensory tool module 108 are deployed at a first depth within a wellbore, the weight module 116 descends further in the wellbore to a second depth, thereby extending the fiber optic cable 114 between the tool string 112 and the weight module 116. In alternative aspects, the length of either or both of the sheathed cable 106 and the fiber optic cable can be eighteen thousand feet (18,000'), twenty thousand feet (20,000'), twenty-five thousand feet (25,000'), thirty thousand feet (30,000'), or a length at any increment or gradient within such ranges.

FIG. 3-1 is a schematic diagram of a tool string 112 and a weighted fiber optic cable positioned above the well head of a wellbore 130', where the weighted fiber optic cable is in an extended position. In some aspects, the weight module 116 can be released from a coupling to the tool string, such that the weight module 116 deploys through the well head 128 and into the wellbore 130'. A breaking mechanism (not shown) can be coupled to the tool string 112, a lowermost sinker bar 110', or the weight module 116 itself, to control the descent of the weight module, in a controlled manner and at a speed that does not damage or break the fiber optic cable 114. As in other aspects, when the fiber optic cable 114 is fully unspooled and extended within the wellbore, the fiber optic cable 114 can extend to a distance of about one hundred to several thousand feet below the sensory tool module 108. In some aspects, a tool string 112 having a weighted fiber optic cable can be used in a wellbore that has a depth of up to thirty thousand feet (30,000'). Accordingly, when the tool string 112 and sensory tool module 108 are deployed at a first depth within a wellbore, the weight module 116 descends further in the wellbore to a second depth, thereby extending the fiber optic cable 114 between the tool string 112 and the weight module 116.

Figure 4:
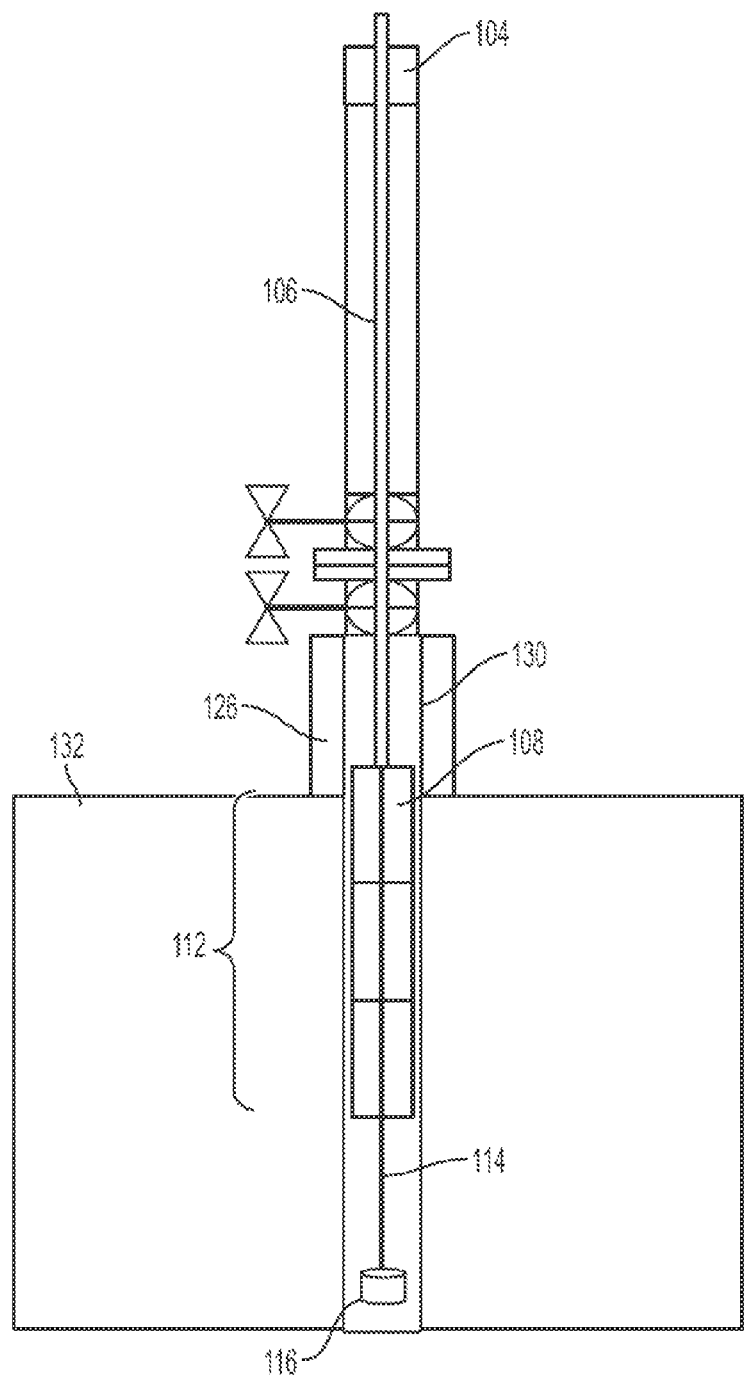
FIG. 4 is a schematic diagram of a tube assembly having a weighted fiber optic cable, where the weighted fiber optic cable is in an extended position and where a tool string is deployed from the tube assembly into a wellbore, according to some aspects of the present disclosure.
Figures 1, 4:
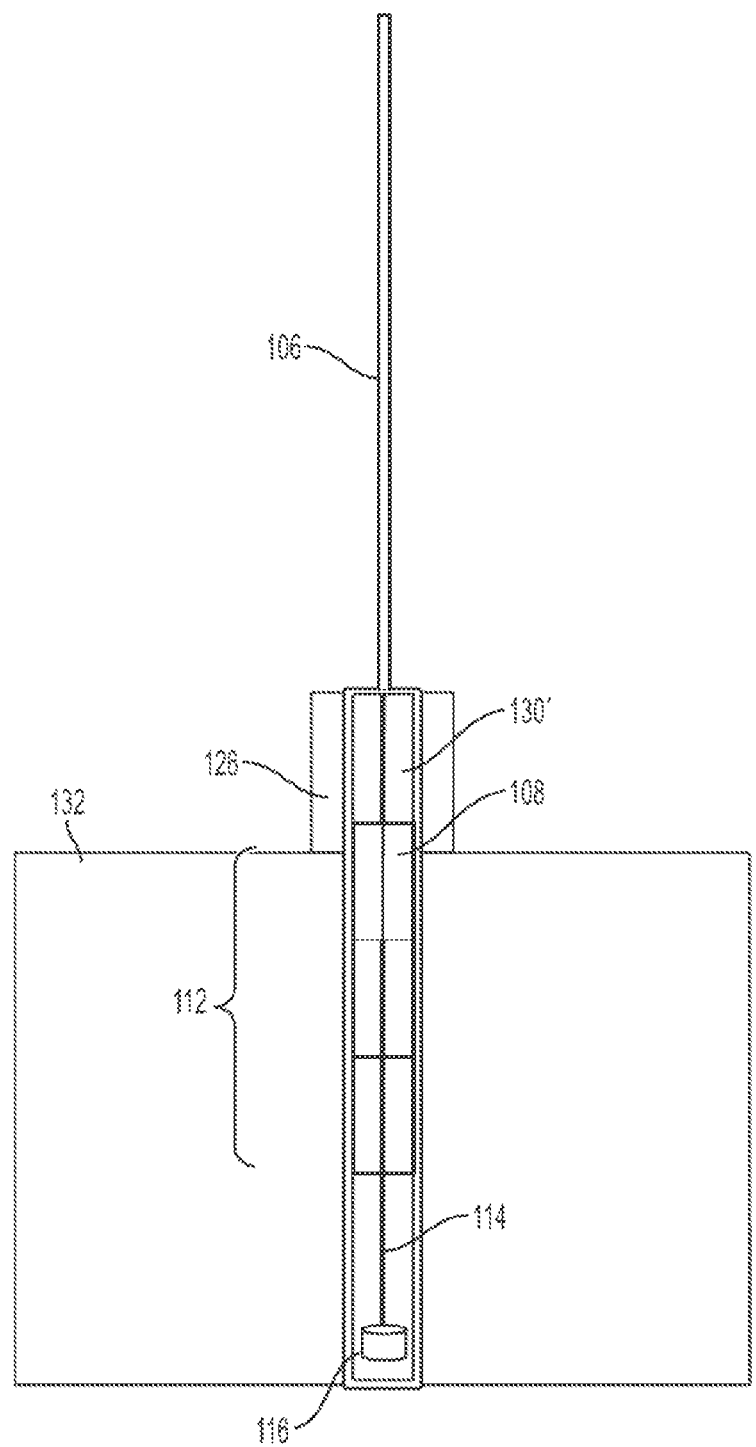

FIG. 4 is a schematic diagram of a tube assembly having a weighted fiber optic cable, where the weighted fiber optic cable is in an extended position and where a tool string 112 is deployed from the tube assembly into a wellbore. When the fiber optic cable 114 is fully extended and suspended below the tool string 112, the overall tool string 112 and weighted fiber optic cable can be further deployed downhole within a wellbore. Additional sheathed cable 106 from a cable spool or other cable source (not shown) can be provided to allow the tool string 112 and weighted fiber optic cable to descend into the wellbore. The tool string 112 and weighted fiber optic cable are both configured and constructed to pass through the assembly valve 118, the well head valve 126, and the wellbore tubing 130.

In some aspects, the weight module 116 can include a retracting mechanism connected to the fiber optic cable 114. The retracting mechanism can be located within the weight module 116 or constructed as part of the exterior of the weight module 116. The retracting mechanism can be a spring-biased device, placing tension on the fiber optic cable 114, drawing the fiber optic cable 114 toward the weight module 116. In such aspects, when the weighted fiber optic cable is in an extended position, the fiber optic cable 114 is connected at its uphole end to the sheathed cable 106 and connected to the weight module 116 at its downhole end. The weight of the weight module 116 can overcome the tension of the retracting mechanism, allowing any coiled fiber optic cable 114' to unspool and remain taut and suspended between the uphole connection of the fiber optic cable 114 to the sheathed cable 106 and the downhole connection of the fiber optic cable 114 to the weight module.

Figure 5:
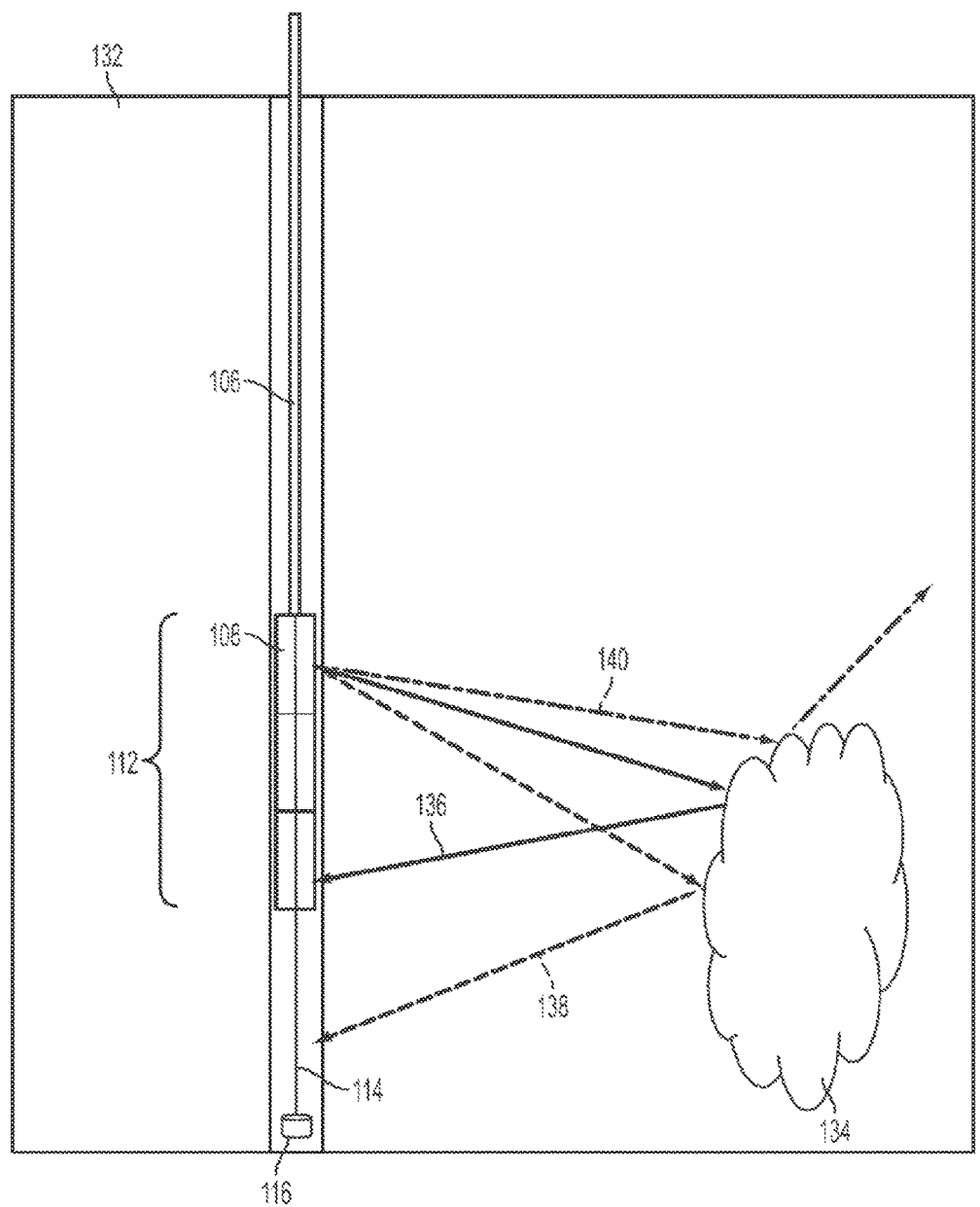
FIG. 5 is a schematic diagram of a tube assembly having a weighted fiber optic cable, where a tool string is deployed in a wellbore in proximity to a reservoir feature and where the weighted fiber optic cable is in an extended position, according to some aspects of the present disclosure.

FIG. 4-1 is a schematic diagram of a tool string 112 and a weighted fiber optic cable, where the weighted fiber optic cable is in an extended position and where a tool string 112 is deployed into a wellbore 130'. As in other embodiments, when the fiber optic cable 114 is fully extended and suspended below the tool string 112, the overall tool string 112 and weighted fiber optic cable can be further deployed downhole within the wellbore 130'. Additional sheathed cable 106 from a cable spool or other cable source (not shown) can be provided to allow the tool string 112 and weighted fiber optic cable to descend into the wellbore. In some aspects, the weight module 116 can include a retracting mechanism connected to the fiber optic cable 114. The retracting mechanism can be located within the weight module 116 or constructed as part of the exterior of the weight module 116. The retracting mechanism can be a spring-biased device, placing tension on the fiber optic cable 114, drawing the fiber optic cable 114 toward the weight module 116. In such aspects, when the weighted fiber optic cable is in an extended position, the fiber optic cable 114 is connected at its uphole end to the sheathed cable 106 and connected to the weight module 116 at its downhole end. The weight of the weight module 116 can overcome the tension of the retracting mechanism, allowing any coiled fiber optic cable 114' to unspool and remain taut and suspended between the uphole connection of the fiber optic cable 114 to the sheathed cable 106 and the downhole connection of the fiber optic cable 114 to the weight module FIG. 5 is a schematic diagram of a tube assembly having a weighted fiber optic cable, where a tool string 112 is deployed in a wellbore in proximity to a reservoir feature 134 and where the weighted fiber optic cable is in an extended position. When at a desired or prescribed depth within the wellbore, the sensory tool module 108 can emit signals into the earth strata 132. In some aspects, these signals can be acoustic signals configured to identify seismic faults and formations 134 within the earth strata 132. The sensory tool module 108, which can be a source tool, can emit signals in an omnidirectional manner, with some of the signals reflecting or deflecting off of a formation 134 in the earth strata 132. In some aspects, a first sensory signal 136 emitted by the sensory tool module 108 can reflect off of the formation 134 and return toward the tool string 112 within the wellbore. Fiber optic cable 114 located within or alongside the tool string 112 can thereby sense and receive the reflected first sensory signal 136. In other aspects, the first sensory signal 136 can reflect off of the formation 134 toward the sheathed cable 106, such that the fiber optic cable 114 located within the wire-line 106 can sense and receive the reflected first sensory signal 136. In further aspects, a second sensory signal 138 emitted by the sensory tool module 108 can reflect off of the formation 134 toward a location below the tool string 112 within the wellbore. Fiber optic cable 114 located below the sensory tool module 108, weighted and extended by the weight module 116, can sense and receive the reflected second sensory signal 138. A third sensory signal 140 can deflect off of the formation 134 in a direction where there is no sensory receptor apparatus.

In many aspects, a plurality of both reflected first sensory signals 136 and a plurality of reflected second sensory signals 138 are collected fiber optic cable 114 located both below the sensory tool module 108 and alongside the sensory tool module 108. Such signals can be transmitted uphole to an interrogator system at the surface of the well, which can further process and transmit the sensory data received that is characteristic of formations 134 sensed within the earth strata 132 and formations 134 therein. In further aspects, the interrogator system can send pulses downhole through the wire-line 106 to trigger signal emission by the sensory tool module 108, or can otherwise control the sensory tool module 108. In other aspects, separate sensory tools unconnected to the presently disclosed system can detect one or more reflected third sensory signals 140 that are not collected by the fiber optic cable 114 in the wellbore.

Figure 6:
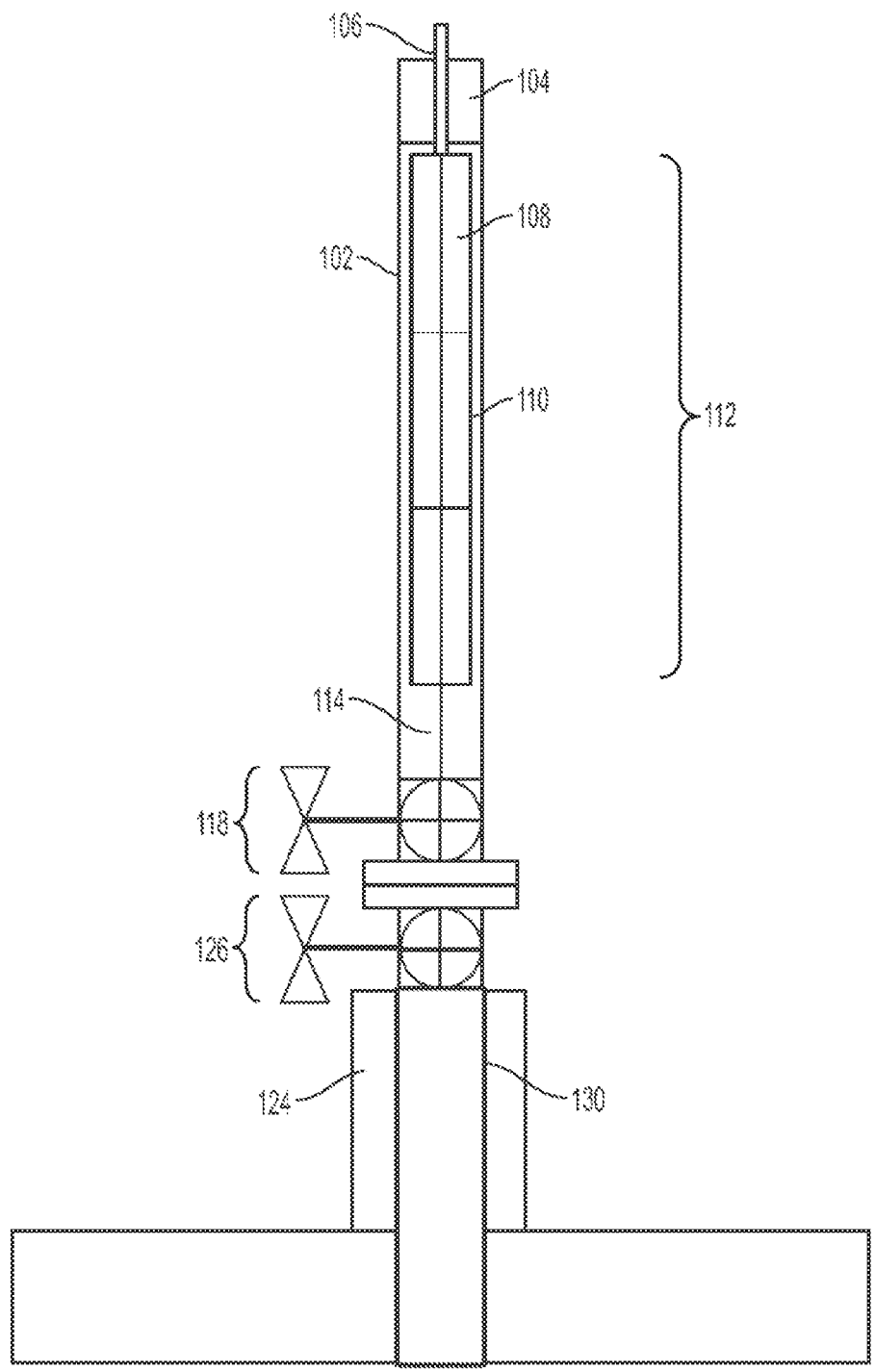
FIG. 6 is a schematic diagram of a tube assembly mounted to the well head of a wellbore after detaching a weighted fiber optic cable, according to some aspects of the present disclosure.

FIG. 6 is a schematic diagram of a tube assembly 100 mounted to the well head 124 of a wellbore after detaching a weighted fiber optic cable. The sensory tool module 108 can be retrieved from a wellbore after being used to detect properties and characteristics of earth strata 132. The tool string 112 can be drawn back uphole into the assembly casing 102, upward past both the head valve 126 and assembly valve 118. The weighted fiber optic cable, however, may remain in the wellbore or wellbore tubing 130 in a position below the head valve 126 and assembly valve 118. Generally, when disconnecting the tube assembly 100 from the well head assembly 122, the assembly valve 118 and head valve 126 are closed to prevent loss of fluid from the wellbore or to prevent foreign objects from entering the wellbore. The closing of either or both of the assembly valve 118 and head valve 126 can sever the fiber optic cable 114, thereby causing the weight module 116 and length of fiber optic cable 114 positioned below the assembly valve 118 or head valve 126 to be disconnected and no longer suspended by a connection to the wire-line 106. The severed fiber optic cable 114 and connected weight module 116 can then sink downhole through the wellbore to the toe of the well. In some aspects, the wellbore can be drilled to have a "rat hole", a region of wellbore past any region of interest that is drilled to provide space for wellbore debris or tool string debris to collect, out of the way of other wellbore tools or apparatus. The severed fiber optic cable 114 and connected weight module 116 can sink into the rat hole region of the wellbore, if present.

In aspects of the weight module 116 having a retracting mechanism, once fiber optic cable 114 connected to the weight module 116 is severed from the tool assembly 100, the retracting mechanism placing tension on the severed fiber optic cable 114 can retract the amount of fiber optic cable 114 still connected to the weight module 116 into a cavity within the weight module, or onto a spool connected to the exterior of the weight module 116. In such aspects, the severed amount of fiber optic cable 114 can be prevented from floating upward in the wellbore, potentially interfering with later tool deployments.

In aspects of the tool string 112 and weight module 116 that are deployed without a tube assembly, the fiber optic cable 114 can be severed at the surface of the well at the well head 126 once the tool string is withdrawn from the wellbore 130', or with an additional cutting tool (not shown) on the tool string 112. In alternative aspects, the entirety of the tool string 112, fiber optic cable 114, and weight module 116 can be pulled up to the surface and extracted from the wellbore.

Figure 7:
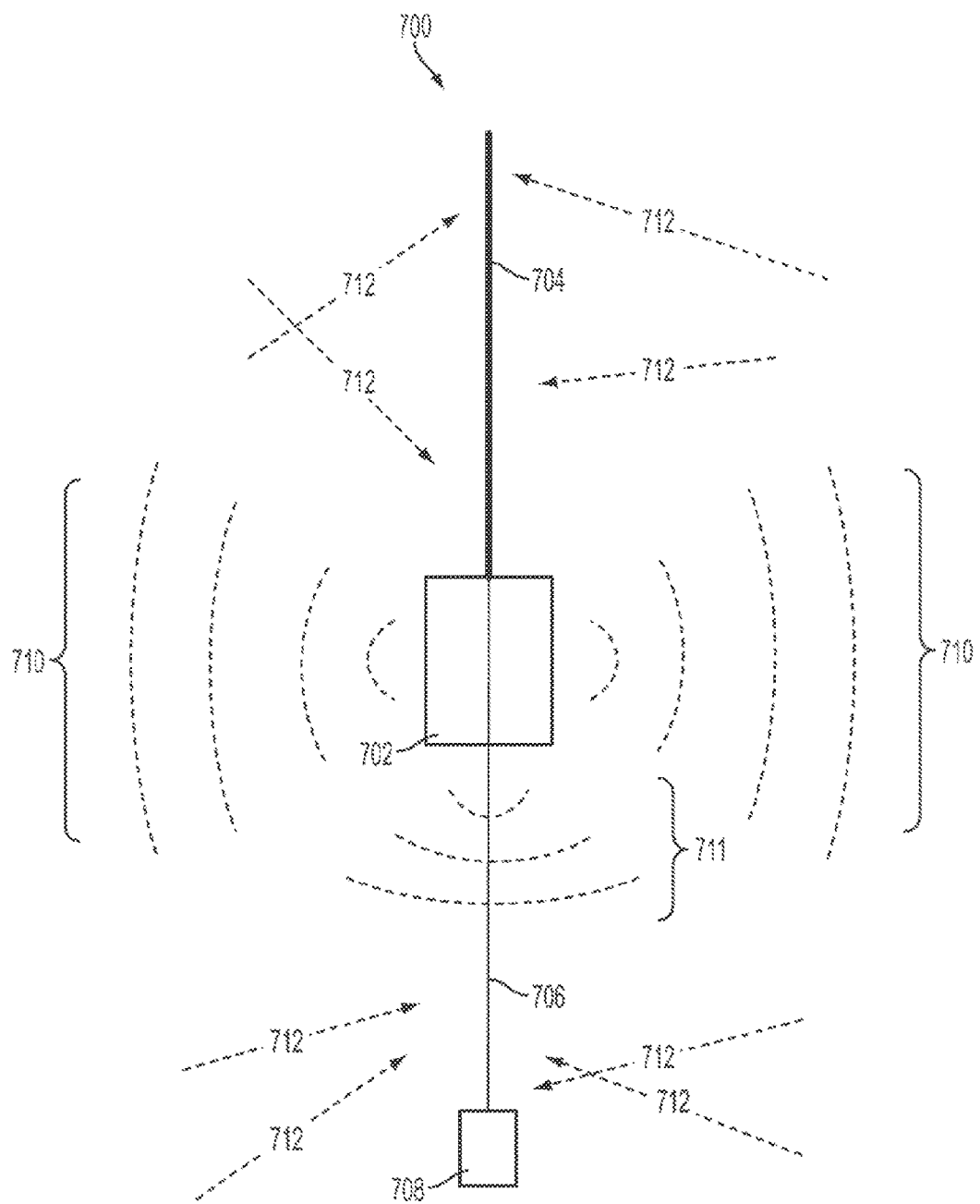
FIG. 7 is a schematic representation of signals emitted by a sensory tool module and received by a weighted fiber optic cable, according to some aspects of the present disclosure.

FIG. 7 is a schematic representation of a sensory assembly 700 showing signals emitted by a sensory tool module and received by a weighted fiber optic cable. In aspects as discussed above, a sensory tool module 702 can be suspended within a wellbore by a sheathed cable 704, where the sheathed cable 704 includes a fiber optic cable 706 that extends through the sheathed cable 704, and where the fiber optic cable 706 further extends past the connection of the sheathed cable 704 with the sensory tool module 702. The fiber optic cable 706 can pass through or around the sensory tool module 702, where the fiber optic cable 706 can be connected at its downhole end to a weight module 708. In such aspects, the sensory tool module 702 can emit emission signals into the surrounding earth strata. In further aspects, the emission signals can be either or both of lateral emission signals 710 or longitudinal emission signals 711. In some aspects, the emission signals are emitted in an omnidirectional manner, while in other aspects, the emission signals can be generated having a cone-like profile, focused in one or more specific directions away from the sensory tool module 702. In such aspects, the emission signals with a cone-like profile can have an aperture expanding at an angle of about 45°, an angle of about 30°, or an angle of about 15°. In alternative aspects, the cone-like profile can be a right circular cone, an elliptical cone, or an oblique cone. In other aspects, the sensory tool module 702 can be a DAS emitting emission signals which are acoustic signals designed to detect seismic fractures in the earth strata. Emission signals that are reflected back toward the sensory assembly 700 are indicated as sensory signals 712 which can be collected by the fiber optic cable 706 located within the sheathed cable 704 and by the fiber optic cable 706 located below the sensory tool module 702.

Figure 8:
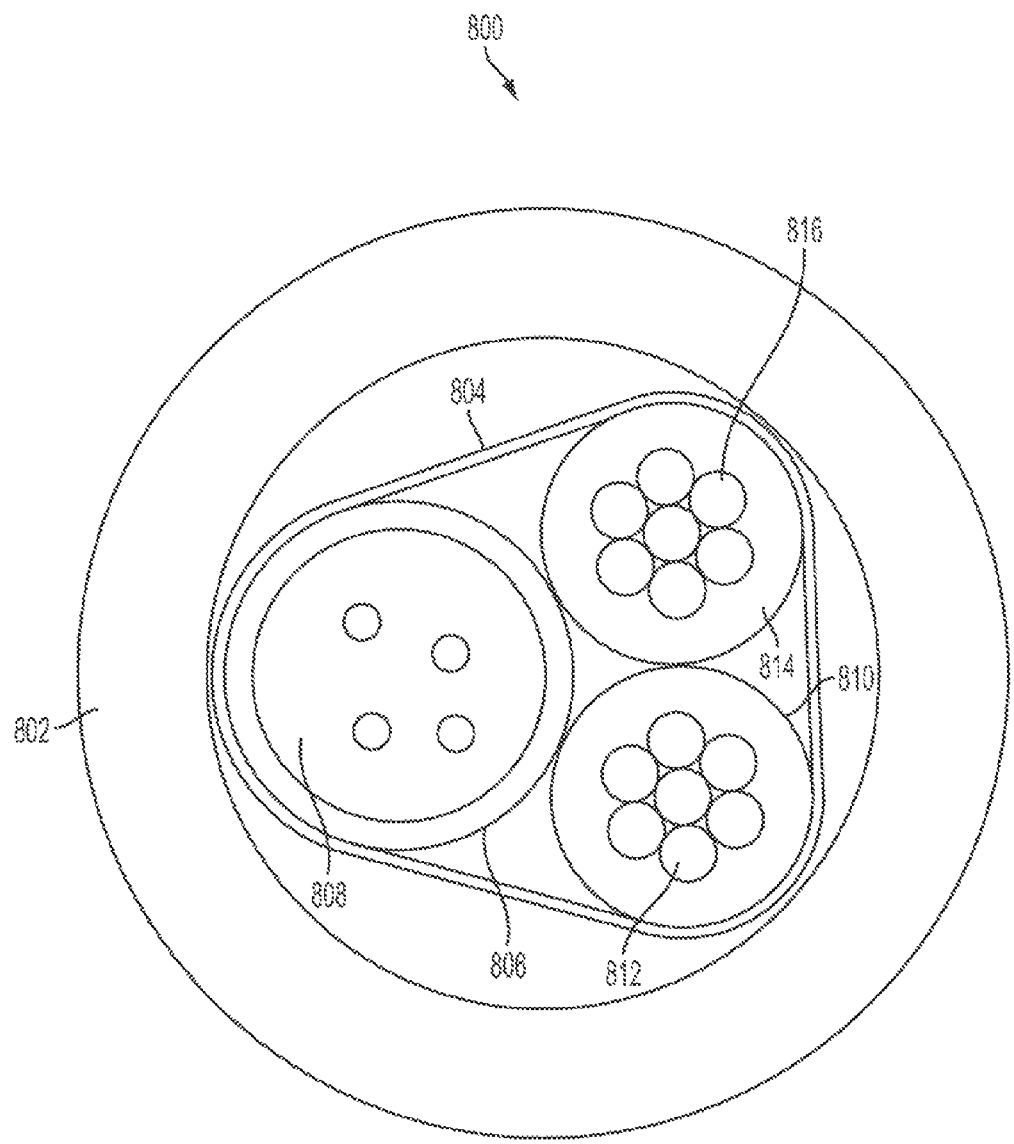
FIG. 8 is a schematic cross-section representation of a cable, according to some aspects of the present disclosure

FIG. 8 is a schematic cross-section representation of a sheathed cable 800, including both fiber optic cable and electrical cable components. The exterior of the sheathed cable 800 can be an outer cladding 802, which in some aspects is a metal tube having a thickness designed to withstand pressures downhole and to protect both electrical cable and fiber optic cable from a wellbore environment. In alternative aspects, the outer cladding 802 can be a wire-line sheath or a slickline sheath. In some aspects, the outer cladding 802 can have a tensile strength of about 2,700 pounds, and operate under a working pressure of about 21,500 psi. Within the interior volume of the outer cladding 802, a wrapping sheath 804 can hold at least one electrical cable 808 and at least one bundle of insulated fiber optic cables 812, 816. The electrical cable 808 can further have its own electrical cladding 806. Similarly, each bundle of insulated fiber optic cables 812, 816 can have an optical cable cladding 810, 814 (respectively). The optical cable cladding 810, 814 can include a wrapping tape, a stainless steel tube, a gel, or variations and combinations thereof surrounding each bundle of insulated fiber optic cables 812, 816.

In various aspects, the sheathed cable 800 can hold one or more fiber optic cables, a single fiber optic cable. In such aspects, the sheathed cable can further hold one or more electrical cables in combination with the one or more fiber optic cables. In other aspects, the outer cladding 802 of the sheathed cable 800 can function as an electrical ground, conducting electricity away from a tool string connected to electrical cables within the sheathed cable 800.

Particular aspects of the present disclosure are directed to a sensory assembly for use with a well, which can include an assembly casing having an upper end and a lower end, a sheathed cable mounted to the upper end of the assembly casing, the sheathed cable having a cladding with at least a fiber optic cable within the cladding, a sensory tool module mounted within the assembly casing and mechanically coupled to the sheathed cable, where the fiber optic cable extends out of the sheathed cable and past the sensory tool module, and a weight module mechanically coupled to a downhole end of the fiber optic cable. A sheathed cable as discussed herein which can be either a wire-line or a slickline cable. A sensory assembly as discussed herein can also include a valve mechanically coupled to and defining the lower end of the assembly casing. A sensory assembly as discussed herein can also include a line head mechanically coupled to and defining the upper end of the assembly casing. A sensory assembly as discussed herein can have a weight module which has a cavity constructed within it to accommodate a length of coiled fiber optic cable. A sensory assembly as discussed herein can have a weight module which includes a retracting mechanism coupled to the fiber optic cable, placing tension on the fiber optic cable to draw the fiber optic cable toward the weight module. A sensory assembly as discussed herein can have a sheathed cable which further holds at least an electrical cable within the cladding. A sensory assembly as discussed herein can have at least one fiber optic cable and at least one electrical cable within the sheathed cable that are braided within the sheathed cable cladding. A sensory assembly as discussed herein can also include one or more sinker bars mounted within the assembly casing, mechanically coupled to the sensory tool module and positioned above the weight module. A sensory assembly as discussed herein can have fiber optic cable which extends past a sensory tool module by passing through an interior of the sensory tool module. A sensory assembly as discussed herein can have fiber optic cable which extends past the sensory tool module by passing around an exterior of the sensory tool module.

Further particular aspects of the present disclosure are directed to a sensory assembly system for use with a wellbore which can include a tube assembly, that tube assembly having an assembly casing having an upper end and a lower end, a sheathed cable mounted to the upper end of the assembly casing, the sheathed cable having a cladding with at least a fiber optic cable within the cladding, a sensory tool module mounted within the assembly casing and mechanically coupled to the sheathed cable, where the fiber optic cable extends out of the sheathed cable and past the sensory tool module, a weight module mechanically coupled to a downhole end of the fiber optic cable, and an assembly valve mechanically coupled to and defining the lower end of the assembly casing, where the assembly system also includes a well head assembly, having a well head valve providing access to a wellbore, constructed to couple with the tube assembly, and an interrogator system, coupled to the sheathed cable, configured to control the sensory tool module. A sensory assembly system as discussed herein can also have a weight module which has a cavity constructed to accommodate a length of coiled fiber optic cable. A sensory assembly system as discussed herein can also have one or more sinker bars mounted within the assembly casing, mechanically coupled to the sensory tool module and positioned above the weight module. A sensory assembly system as discussed herein can be deployed such that, when the sensory tool module is deployed within the wellbore at a first depth, the weight module descends within the wellbore to a second depth below the sensory tool module, where the fiber optic cable is at least in part extended between the sensory tool module and the weight module. A sensory assembly system as discussed herein can be deployed such that the fiber optic cable at least in part extended between the sensory tool module and the weight module collects backscatter signal directed below the sensory tool module. A sensory assembly system as discussed herein can have the fiber optic cable held within the wire-line collecting backscatter signal directed above the sensory tool module. A sensory assembly system as discussed herein can have the interrogator system receive backscatter signal data from the fiber optic cable and process the backscatter signal data. A sensory assembly system as discussed herein can have the interrogator system also receive backscatter signal data from the fiber optic cable and process the backscatter signal data. A sensory assembly system as discussed herein can be deployed such that when the fiber optic cable is at least in part extended between the sensory tool module and the weight module, and such that when either or both of the assembly valve and well head valve are closed, the fiber optic cable is severed. A sensory assembly system as discussed herein can also include a braking mechanism coupled to the weight module, such the weight module descends within the wellbore away from the sensory tool module at a speed that does not damage or break the fiber optic cable.

Alternative aspects of the present disclosure are directed to a sensory assembly for use with a well, particularly for use with a well that does not have an express pressure control system, and thus does not require a pressure seal to be formed by an assembly casing. The sensory assembly can include a sheathed cable having a cladding with at least a fiber optic cable within the cladding, a sensory tool module coupled to the sheathed cable, where the fiber optic cable extends out of the sheathed cable and past the sensory tool module, and a weight module mechanically coupled to a downhole end of the fiber optic cable. A sensory assembly as discussed herein can further include the weight module having a cavity constructed to accommodate a length of coiled fiber optic cable. A sensory assembly as discussed herein can further include a retracting mechanism coupled to the fiber optic cable, placing tension on the fiber optic cable to draw the fiber optic cable toward the weight module. A sensory assembly as discussed herein can have the sheathed cable which further holds at least one electrical cable within its cladding. A sensory assembly as discussed herein can further have at least one fiber optic cable and at least one electrical cable within the sheathed cable which are braided within the sheathed cable cladding. A sensory assembly as discussed herein can further include one or more sinker bars, mechanically coupled to the sensory tool module and positioned above the weight module. A sensory assembly as discussed herein can include fiber optic cable which extends past the sensory tool module by passing through an interior of the sensory tool module. A sensory assembly as discussed herein can further include fiber optic cable which extends past the sensory tool module by passing around an exterior of the sensory tool module.

The subject matter of aspects and examples of this disclosure is described here with specificity to meet statutory requirements, but this description is not necessarily intended to limit the scope of the claims. The claimed subject matter may be embodied in other ways, may include different elements or steps, and may be used in conjunction with other existing or future technologies. Throughout this description for the purposes of explanation, numerous specific details are set forth in order to provide a thorough understanding of examples and aspects of the subject matter disclosed herein. It will be apparent, however, to one skilled in the art that the many examples or aspects may be practiced without some of these specific details. In some instances, structures and devices are shown in diagram or schematic form to avoid obscuring the underlying principles of the described examples or aspects. This description should not be interpreted as implying any particular order or arrangement among or between various steps or elements except when the order of individual steps or arrangement of elements is explicitly described.

With these aspects in mind, it will be apparent from this description that aspects of the described techniques may be embodied, at least in part, in software, hardware, firmware, or any combination thereof. It should also be understood that aspects can employ various computer-implemented functions involving data stored in a data processing system. That is, the techniques may be carried out in a computer or other data processing system in response executing sequences of instructions stored in memory. In various aspects, hardwired circuitry may be used independently, or in combination with software instructions, to implement these techniques. For instance, the described functionality may be performed by specific hardware components, such as an interrogator system, containing hardwired logic for performing operations, or by any combination of custom hardware components and programmed computer components. The techniques described herein are not limited to any specific combination of hardware circuitry and software.

The foregoing description of the disclosure, including illustrated aspects and examples has been presented only for the purpose of illustration and description and is not intended to be exhaustive or to limit the disclosure to the precise forms disclosed. Numerous different modifications, adaptations, and arrangements of the components depicted in the drawings or described above, as well as components and steps not shown or described, are possible. Similarly, some features and subcombinations are useful and may be employed without reference to other features and subcombinations. Examples and aspects of the subject matter have been described for illustrative and not restrictive purposes, and alternative examples or aspects will become apparent to those skilled in the art without departing from the scope of this disclosure. Accordingly, the present subject matter is not limited to the examples or aspects described above or depicted in the drawings, and various embodiments, examples, aspects, and modifications can be made without departing from the scope of the claims below.

That which is claimed is:

1. A sensory assembly for use with a well, comprising:
a sheathed cable having a cladding with at least a fiber optic cable within the cladding;
a sensory tool module mechanically coupled to the sheathed cable, where the fiber optic cable extends out of the sheathed cable and past the sensory tool module; and
a weight module mechanically coupled to a downhole end of the fiber optic cable, wherein the weight module further comprises a retracting mechanism coupled to the fiber optic cable, placing tension on the fiber optic cable to draw the fiber optic cable toward the weight module.

2. A sensory assembly according to claim 1, further comprising an assembly casing having an upper end and a lower end, where the sheathed cable is mounted to the upper end of the assembly casing and where the sensory tool module is mounted within the assembly casing.

3. A sensory assembly according to claim 2, a valve mechanically coupled to and defining the lower end of the assembly casing.

4. A sensory assembly according to claim 2, further comprising a line head mechanically coupled to and defining the upper end of the assembly casing.

5. A sensory assembly according to claim 1, wherein the weight module has a cavity constructed to accommodate a length of coiled fiber optic cable.

6. A sensory assembly according to claim 1, wherein the sheathed cable further holds at least an electrical cable within the cladding.

7. A sensory assembly according to claim 6, wherein at least one fiber optic cable and at least one electrical cable within the sheathed cable are braided within the sheathed cable cladding.

8. A sensory assembly according to claim 1, further comprising one or more sinker bars mechanically coupled to the sensory tool module and positioned above the weight module.

9. A sensory assembly according to claim 1, wherein the fiber optic cable extends past the sensory tool module by passing through an interior of the sensory tool module.

10. A sensory assembly according to claim 1, wherein the fiber optic cable extends past the sensory tool module by passing around an exterior of the sensory tool module.

11. A sensory assembly system for use with a wellbore comprising:
a tube assembly comprising:
an assembly casing having an upper end and a lower end;
a sheathed cable mounted to the upper end of the assembly casing, the sheathed cable having a cladding with at least a fiber optic cable within the cladding;
a sensory tool module mounted within the assembly casing and mechanically coupled to the sheathed cable, where the fiber optic cable extends out of the sheathed cable and past the sensory tool module;
a weight module mechanically coupled to a downhole end of the fiber optic cable; and
an assembly valve mechanically coupled to and defining the lower end of the assembly casing;
a well head assembly, having a well head valve providing access to a wellbore, constructed to couple with the tube assembly, wherein when the fiber optic cable is at least in part extended between the sensory tool module and the weight module, and wherein when either or both of the assembly valve and well head valve are closed, the fiber optic cable is severed; and
an interrogator system, coupled to the sheathed cable, configured to control the sensory tool module.

12. A sensory assembly system according to claim 11, wherein the weight module has a cavity constructed to accommodate a length of coiled fiber optic cable.

13. A sensory assembly system according to claim 11, further comprising one or more sinker bars mounted within the assembly casing, mechanically coupled to the sensory tool module and positioned above the weight module.

14. A sensory assembly system according to claim 11, wherein when the sensory tool module is deployed within the wellbore at a first depth, the weight module descends within the wellbore to a second depth below the sensory tool module, where the fiber optic cable is at least in part extended between the sensory tool module and the weight module.

15. A sensory assembly system according to claim 14, wherein the fiber optic cable at least in part extended between the sensory tool module and the weight module collects backscatter signal directed below the sensory tool module.

16. A sensory assembly system according to claim 15, wherein the fiber optic cable held within the sheathed cable collects backscatter signal directed above the sensory tool module.

17. A sensory assembly system according to claim 16, wherein the interrogator system receives backscatter signal data from the fiber optic cable and processes the backscatter signal data.

18. A sensory assembly system according to claim 15, wherein the interrogator system receives backscatter signal data from the fiber optic cable and processes the backscatter signal data.

19. A sensory assembly system according to claim 11, further comprising a braking mechanism coupled to the weight module, such the weight module descends within the wellbore away from the sensory tool module at a speed that does not damage or break the fiber optic cable.

20. A sensory assembly system according to claim 11, wherein the weight module further comprises a retracting mechanism coupled to the fiber optic cable, placing tension on the fiber optic cable to draw the fiber optic cable toward the weight module.

* * * * *